United States Patent Office 3,072,688
Patented Jan. 8, 1963

3,072,688
PROCESS FOR THE INTERCONVERSION OF EPIMERIC 21-METHYL STEROIDS
Hans-Jurgen E. Hess, Groton, Conn., assignor to Chas. Pfizer & Co., Inc., New York, N.Y., a corporation of Delaware
No Drawing. Filed July 29, 1960, Ser. No. 46,080
7 Claims. (Cl. 260—397.45)

This application is concerned with a new and useful process for the interconversion of epimeric 21-methyl steroids.

A new class of therapeutically useful steroids has recently been described. These pregnane derivatives are characterized by the presence of a three carbon atom side chain at the 17β-position, in contrast to the previously known active steroids, all of which have uniformly carried a two carbon atom side chain at the 17β-position. The former class may be characterized as 17β-(α-hydroxy-propanoyl)-substituted steroids, the latter as 17β-(α-hydroxy-acetyl)-substituted steroids. More simply, the former may be referred to as 21-methyl steroids.

The compound, 9α-fluoro-21-methyl-$\Delta^{1,4}$-pregnadiene-11β,17α,21-triol-3,20-dione 21-acetate is a representative of this new class of compounds. The formulas for both epimers of this compound are shown below. The carbon atom marked with the asterisk is asymmetric and gives rise to the two epimeric forms.

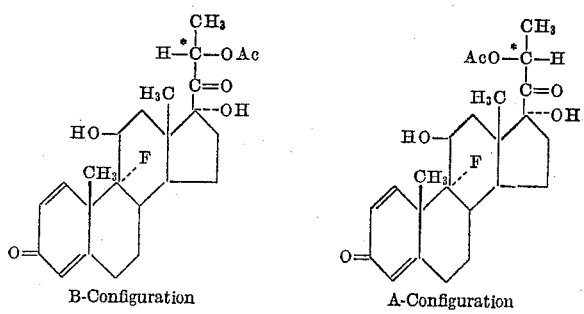

B-Configuration     A-Configuration

Both epimers of compounds of this nature are active, but not necessarily to the same extent. The conversion of the less active epimer to the more active one is of obvious value to provide the physician or veterinarian with a more potent therapeutic agent at a lower dosage level than obtained with mixtures. The conversion of the more active epimer to the less active is also extremely useful in chemical and medical research since for the first time, it is possible to provide this epimer to evaluate the physiological effects of configurational changes in the steroid molecule. Furthermore, obtaining the less active epimer in pure form by this process provides an intermediate for the preparation of other steroids having the same configuration at the 21-position with more active substituents elsewhere on the molecule, for instance, a fluorine in the 9-position.

It has been known for some time to epimerize 17,20,21-triols so as to invert the configuration at the 20-position. Fukushima et al. [Journal of Biological Chemistry, 212, 449 (1955)], for example, show the inversion of a representative of this class of compounds by formation of a 17,21-diacetate-20-tosylate and postulate a reaction mechanism involving the neighboring group participation between the 17- and 20-positions. The mechanism is shown below in formulas in which only the C- and the D-ring of the steroid substrate is shown.

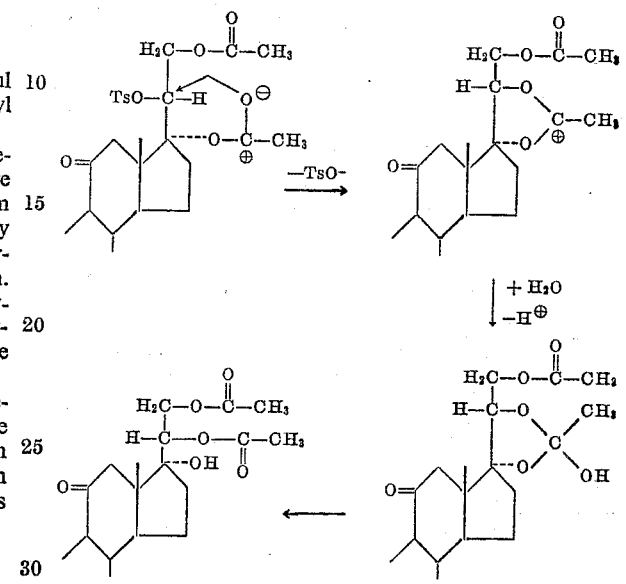

The overall effect of this reaction is saponification of the ester groups at the 17- and the 20-positions with a concomitant shift of the acetyl group at the 17-position to the 20-position coupled with inversion of configuration at the 20-position. The importance of neighboring group participation is emphasized by the fact that treatment of pregnane-3α,17α,20β,21-tetrol-11-one-3,21-diacetate 20-tosylate with potassium acetate in glacial acetic acid under conditions which would be expected to produce inversion instead produces a 13,20,21-triacetate in which the β-configuration at the 20-position is maintained. Beyler et al. [Journal of Organic Chemistry, 24, 1386 (1959)], have converted $\Delta^{1,4}$-pregnadiene-17α,20β,21-triol-3,11-dione 21-acetate to $\Delta^{1,4}$-pregnadiene-17α,20α,21-triol-3,11-dione 20,21-diacetate by the following series of reactions in which it will be noted that exactly the same shift and inversion takes place.

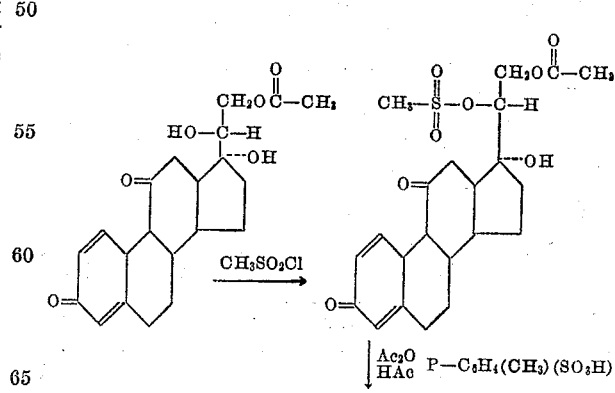

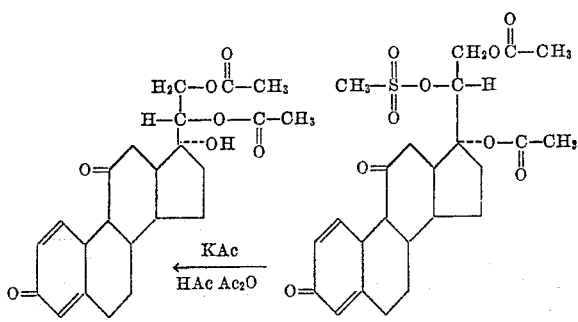

With this in mind, it is indeed surprising to find that it is possible to invert the configuration at the 21-carbon atom of 21-methyl steroids in which the neighboring group is a carbonyl group rather than an acylated hydroxyl group. Further, the hydroxyl group which is present but at a carbon atom twice removed from the 20-position is not acylated.

In carrying out the process of this reaction, a 21-monosulfonic acid ester of the steroid substrate is reacted with an alkali metal salt of a carboxylic acid in a reaction inert organic solvent.

The identity of the carboxylic acid from which the alkali metal salt is derived is not critical. In fact, any carboxylic acid is suitable which, either as the acid itself or one of its modifications, e.g., acid halide or anhydride, will under known conditions form a 21-carboxylic acid ester of a 21-hydroxy steroid. Thus, the acid may be aliphatic or aromatic, substituted or unsubstituted, monobasic or polybasic. There may be mentioned by way of example, acetic, propionic, valeric, citric, tartaric, maleic, fumaric, octadecanoic, cyclopentylpropionic, butenoic, trichloroacetic, α-bromopropionic, cyclohexanoic, benzoic, phenylacetic, benzoic, p-chlorobenzoic and p-nitrobenzoic. In the usual practice of the invention, however, alkali metal salts derived from mono- and dicarboxylic acids containing only carbon, hydrogen and oxygen up to a total of six carbon atoms will be employed. This is because these are the esters most often used when steroid compounds are utilized for their therapeutic activity.

Nor is the selection of the sulfonic acid ester critical. One may employ the p-toluenesulfonic acid ester (tosyl ester), the p-bromo-benzenesulfonic acid ester (brosyl ester), the p-nitro-benzenesulfonic acid ester (nosyl ester) or various alkane sulfonic acid esters such as the methanesulfonic acid ester (mesyl ester) or ethanesulfonic acid ester with equal facility. Mesylates are generally preferred, however, since the starting material is readily available and somewhat easier to work with.

The reaction takes place in a reaction inert lower aliphatic oxygenated solvent containing up to five carbon atoms. Esters, ketones and acids are especially suitable. Dimethylformamide may also be used. Mixed solvent systems are often employed. Examples of solvents which may be used for the processes of this invention include acetic acid, propionic acid, valeric acid, ethyl acetate, methyl propionate, acetone and methyl isopropyl ketone. Of these, acetone is preferred since it is readily available and affords high yields. It may be mixed with dimethylformamide to provide a higher boiling solvent. Mixtures containing from about 10% to about 50% by volume of the latter compound are useful.

The reaction is carried out at a temperature of from about 20° C. to about 70° C. for a period of from about 1 hour to about 24 hours. Preferred conditions include a temperature of from about 50° C. to about 70° C. for a period of from about 1 to about 4 hours. These are preferred for practical considerations since they represent a reasonable compromise between heat requirements and time requirements.

Although theoretically equimolar portions of steroid substrate and alkali metal salt can be used, a large excess of salt is generally employed to insure complete reaction of the more expensive steroid. Thus, a quantity of salt ranging from about a 200% molar excess to about a 2000% molar excess or even more is used, with from about a 1000% molar excess to about a 2000% molar excess being preferred.

The process of this invention then comprises a process for the interconversion of the epimeric forms of 21-methyl steroids by reaction of the 21-monosulfonic acid ester of the epimer to be inverted, in dimethyl formamide or a lower aliphatic oxygenated solvent containing up to five carbon atoms, with from about a 200% molar excess to about a 2000% molar excess of an alkali metal salt of a carboxylic acid at a temperature of from about 20° C. to about 70° C. for a period of from about 1 to about 24 hours, to produce a 21-carboxylic acid ester having the opposite configuration. In preferred modifications, acetone, dimethylformamide or mixtures of these solvents are used.

An inert atmosphere, e.g. nitrogen, may be used in carrying out the reaction to minimize side reactions, but it is not necessary.

Isolation of the final products is in accordance with procedures well known in the art for isolating steroid esters.

Procedures for the preparation and isolation of epimeric forms of 21-methyl steroids are already known. Agnello has described a procedure which featured the reaction of diazomethane with a 21-aldehyde and subsequent enzymatic stereo-selective reduction with fermenting yeast of a $C_{20,21}$-diketone formed from the aldehyde-diazomethane reaction product (Agnello et al., Abstract 137th ACS Meeting, Cleveland, Ohio, April 1960, p. 20 N.). This procedure gives an epimer of a 21-alcohol to which the 21-B-configuration was arbitrarily assigned.

Figdor has described a procedure which gives both the 21A and the 21B epimers. In this procedure, etiocholenic acids were converted via the acid chloride with diazoethane to the diazoketone, thence to a chloroketone and the chlorine atom at the 21-position was replaced with an acyloxy group to give a 21-methyl-21-acyloxy steroid (Figdor et al., Abstract 137th ACS Meeting, Cleveland, Ohio, April 1960, p. 21 N.).

It is interesting to note that in some instances, the 21-methyl steroid having the B-configuration is more active as an anti-inflammatory agent than the epimer having the A-configuration. Llaurado and Schneider have shown this with the epimers of 9α-fluoro-21-methyl-$\Delta^{1,4}$-pregnadiene-11β,17α,21-triol-3,20-dione 21-acetate (44th Annual Meeting of the Federation of American Societies for Experimental Biology; Abstract in: Fed. Proc. 19, 1959 (1960). In this publication, the epimer having the B-configuration is referred to as the β-ol and the epimer with the A-configuration is designated as the α-ol). It is apparent then that the process of this invention is useful in those instances where the physician or veterinarian prefers to utilize the more active epimer.

The following examples are given solely for the purpose of illustration and are not to be construed as limitations of this invention, many apparent variations of which are possible without departing from the spirit or scope thereof.

In these examples, the epimers having the A-configuration are referred to as 21A-compounds and those with the B-configuration as 21B-compounds.

EXAMPLE I

*General Preparation of Sulfonic Acid Esters*

A total of 1.8 grams of 21-methyl-$\Delta^4$-pregnene-17α, 21A-diol-3,20-dione was dissolved in 50 cc. of pyridine and the solution cooled to −10° C. To this solution, there was added 2.5 grams of mesyl chloride in a dropwise manner over a period of 20 minutes. After stirring for 4 hours at 0° C., the reaction mixture was again cooled to −10° C. and the excess of mesyl chloride destroyed by the dropwise addition of 10 cc. of water over a 20 minute period. The mixture was then poured into 200 cc. of water and extracted with three 70 cc. portions of methylene chloride. The combined methylene chloride extracts were washed with three 100 cc. portions of ice cold dilute hydrogen chloride solution (one part concentrated hydrochloric acid, five parts water) to pH 1–2, then with water to neutrality. The organic solution was dried over anhydrous sodium sulfate, filtered and the solvent removed in vacuo to leave the desired product as a residue.

The product obtained by this procedure was sufficiently pure for inversion. However, a purer compound could be obtained by the trituration of this residue with methanol.

This procedure was used to prepare mesylates, tosylates, brosylates, nosylates and ethanesulfonates of steroid substrates in both the A- and the B-configuration for use in the process of this invention.

EXAMPLE II

*21-Methyl-$\Delta^4$-Pregnene-17α,21B-Diol-3,11,20-Trione 21-Acetate*

A solution containing 20 grams of 21-methyl-$\Delta^4$-pregnene-17α,21A-diol-3,11,20-trione 21-mesylate in 200 cc. of acetone was prepared and a 2000% molar excess of potassium acetate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE III

*2α,21-Dimethyl-$\Delta^{1,4}$-Pregnadiene-11β,17α,21B-Triol-3,20-Dione 21-Propionate*

A solution containing 10 grams of 2α,21-dimethyl-$\Delta^{1,4}$-pregnadiene-11β,17α,21A-triol-3,20-dione 21-tosylate in 200 cc. of dimethyl formamide was prepared and a 200% excess of sodium propionate was added. The mixture was maintained at 70° C. for 1 hour and the solvent completely removed in vacuo. The residue was taken up in 100 cc. of chloroform, dried over anhydrous sodium sulfate, filtered and the desired product recovered by removing the solvent in vacuo.

EXAMPLE IV

*6α-Fluoro-21-Methyl-$\Delta^4$-Pregnene-11β,17α,21A-Triol-3,20-Dione 21-Benzoate*

A solution containing 15 grams of 6α-fluoro-21methyl-$\Delta^4$-pregnene-11β,17α,21B-triol-3,20-dione 21-brosylate was taken up in 200 cc. of acetone containing 10% dimethylformamide by volume and a 1000% molar excess of sodium benzoate was added. The mixture was maintained at 60° C. for 10 hours and most of the solvent removed in vacuo. Water was added and the mixture extracted three times with 75 cc. portions of ethylene chloride. The organic layer was separated, dried over anhydrous magnesium sulfate, filtered and the solvent removed in vacuo to yield the desired product as a residue.

EXAMPLE V

*6α-Chloro-21-Methyl-$\Delta^4$-Pregnene-11β,17α,21A-Triol-3,20-Dione 21-Butenoate*

A solution containing 15 grams of 6α-chloro-21-methyl-$\Delta^4$-pregnene-11β,17α,21B-triol-3,20-dione 21-nosylate was taken up in 200 cc. of a 1:1 mixture of acetone and dimethylformamide and a 1000% molar excess of lithium butenoate was added. The mixture was maintained at 60° C. for 10 hours and most of the solvent removed in vacuo. Water was added and the mixture extracted three times with 75 cc. portions of ethylene chloride. The organic layer was separated, dried over anhydrous magnesium sulfate, filtered and the solvent removed in vacuo to yield the desired product as a residue.

EXAMPLE VI

*21-Methyl-$\Delta^{4,6}$-Pregnadiene-11β,14α,17α,21A-Tetrol-3,20-Dione 21-Trimethylacetate*

A solution containing 3 grams of 21-methyl-$\Delta^{4,6}$-pregnadiene-11β,14α,17α,21B-tetrol-3,20-dione 21-ethanesulfonate in 100 cc. of acetic acid was prepared and 2000% molar excess of cesium trimethylacetate was added. The mixture was maintaind at 70° C. for 2 hours under nitrogen. An equal volume of methylene chloride was added and the mixture was washed several times with 100 cc. portions of 5% sodium hydroxide. The organic layer was separated and evaporated in vacuo. The residue was taken up in 50 cc. of methylene chloride, washed three times with equal volumes of water, dried over anhydrous magnesium sulfate, filtered and evaporated to leave the desired product as a residue.

EXAMPLE VII

*16α,21-Dimethyl-$\Delta^{1,4,6}$-Pregnatriene-17α,21A-Diol-3,11,20-Trione 21-Decanoate*

A solution containing 5 grams of 16α,21-dimethyl-$\Delta^{1,4,6}$-pregnatriene-17α,21B-diol-3,11,20-trione 21-mesylate in 100 cc. of ethyl acetate was prepared and a 100% molar excess of potassium decanoate was added. The mixture was maintained at 20° C. for 24 hours under nitrogen. Most of the solvent was then evaporated in vacuo. Water was added and the mixture was extracted three times with 80 cc. portions of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE VIII

*16β,21-Dimethyl-$\Delta^{1,4,6}$-Pregnatriene-17α,21A-Diol-3,11,20-Trione 21-Decanoate*

A solution containing 5 grams of 16β,21-dimethyl-$\Delta^{1,4,6}$-pregnatriene-17α,21B-diol-3,11,20-trione 21-mesylate in 100 cc. of methylisopropyl ketone was prepared and a 100% molar excess of potassium decanoate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE IX

*9α-Fluoro-21-Methyl-$\Delta^{1,4}$-Pregnadiene-11β,17α,21B-Triol-3,20-Dione 21α-Phenyl-Acetate*

A solution containing 5 grams of 9α-fluoro-21-methyl-$\Delta^{1,4}$-pregnadiene-11β,17α,21A-triol-3,20-dione 21-tosylate in 100 cc. of methylisopropyl ketone was prepared and a 100% molar excess of sodium α-phenylacetate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE X

$9\alpha$-Bromo-21-Methyl-$\Delta^{4,6}$-Pregnadiene-17$\alpha$,21A-Diol-3,11,20-Trione 21-Valerate A solution containing 10 grams of 9$\alpha$-bromo-21-methyl-$\Delta^{4,6}$-pregnadiene-17$\alpha$,21B-diol-3,11-20-trione 21-tosylate in 200 cc. of dimethylformamide was prepared and a 200% excess of sodium valerate was added. The mixture was maintained at 70° C. for 1 hour and the solvent completely removed in vacuo. The residue was taken up in 100 cc. of chlorofrm, dried over anhydrous sodium sulfate, filtered and the desired product recovered by removing the solvent in vacuo.

EXAMPLE XI

21-Methyl-$\Delta^{4,6}$-Pregnadiene-17$\alpha$,21A-Diol-3,11,20-Trione 21-Toluate A solution containing 10 grams of 21-methyl-$\Delta^{4,6}$-pregnadiene-17$\alpha$,21B-diol-3,11,20-trione 21-brosylate in 200 cc. of dimethylformamide was prepared and a 200% excess of sodium toluate was added. The mixture was maintained at 50° C. for 10 hours and the solvent completely removed in vacuo. The residue was taken up in 100 cc. of chloroform, dried over anhydrous sodium sulfate, filtered and the desired product recovered by removing the solvent in vacuo.

EXAMPLE XII

21-Methyl-$\Delta^{4,6}$-Pregnadiene-17$\alpha$,21A-Diol-3,20-Dione-21-p-Nitrobenzoate A solution containing 10 grams of 21-methyl-$\Delta^{4,6}$-pregnadiene-17$\alpha$,21B-diol-3,20-dione 21-tosylate in 200 cc. of dimethylformamide was prepared and a 200% excess of sodium p-nitrobenzoate was added. The mixture was maintained at 50° C. for 10 hours and the solvent completely removed in vacuo. The residue was taken up in 100 cc. of chloroform, dried over anhydrous sodium sulfate, filtered and the desired product recovered by removing the solvent in vacuo.

EXAMPLE XIII

6$\alpha$,9$\alpha$-Difluoro-21-Methyl-$\Delta^{1,4}$-Pregnadiene-11$\beta$,17$\alpha$-21B-Triol-3,20-Dione 21-Acetate A solution containing 20 grams of 6$\alpha$,9$\alpha$-difluoro-21-methyl-$\Delta^{1,4}$-pregnadiene-11$\beta$,17$\alpha$,21A-triol-3,20-dione 21-mesylate in 200 cc. of acetone was prepared and a 2000% molar excess of potassium acetate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE XIV

9$\alpha$-Fluoro-21-Methyl-$\Delta^{1,4}$-Pregnadiene-11$\beta$,17$\alpha$,21B-Triol-3,20-Dione 21-Acetate A solution containing 20 grams of 9$\alpha$-fluoro-21-methyl-$\Delta^{1,4}$-pregnadiene-11$\beta$,17$\alpha$,21A-triol-3,20-dione 21-mesylate in 200 cc. of acetone was prepared and a 2000% molar excess of potassium acetate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE XV

6$\alpha$,9$\alpha$-Difluoro-21-Methyl-$\Delta^{1,4}$-Pregnadiene-11$\beta$,17$\alpha$,21A-Triol-3,20 21-Acetate A solution containing 20 grams of 6$\alpha$,9$\alpha$-difluoro-21-methyl-$\Delta^{1,4}$-pregnadiene-11$\beta$,17$\alpha$,21B-triol-3,20-dione 21-mesylate in 200 cc. of acetone was prepared and a 2000% molar excess of potassium acetate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE XVI

9$\alpha$-Fluoro-21-Methyl-$\Delta^{1,4}$-Pregnadiene-11$\beta$,17$\alpha$,21A-Triol-3,20-Dione 21-Acetate A solution containing 20 grams of 9$\alpha$-fluoro-21-methyl-$\Delta^{1,4}$-pregnadiene-11$\beta$,17$\alpha$,21B-triol-3,20-dione 21-mesylate in 200 cc. of acetone was prepared and a 2000% molar excess of potassium acetate was added. The mixture was maintained at 20° C. for 24 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

EXAMPLE XVII

21-Methyl-$\Delta^4$-Pregnene-17$\alpha$,21A-Diol-3,11,20-Trione 21-Acetate

A solution containing 20 grams of 21-methyl-$\Delta^4$-pregnene-17$\alpha$,21B-diol-3,11,20-trione 21-mesylate in 200 cc. of acetone was prepared and a 2000% molar excess of potassium acetate was added. The mixture was maintained at 50° C. for 4 hours. Most of the solvent was then evaporated in vacuo. Water was added and the mixture was extracted three times with 80 cc. of methylene chloride. The organic layer was separated, dried over anhydrous sodium sulfate, filtered and the solvent evaporated to leave the desired product as a residue. It was purified by redissolving in 20 cc. of hot acetone and cooling on an ice bath with stirring for one hour. The purified product precipitated, was filtered and was washed with acetone.

The following table shows the melting points (M.P.) and specific rotations of some of the compounds prepared using the process of this invention. The specific rotations were determined in dioxane at approximately 25° C.

TABLE I

I. 21-methyl-$\Delta^4$-pregnene-17$\alpha$,21B-diol-3,11,20-trione 21-acetate

M.P.=177–178° C.
$[\alpha]_D = +191°$

II. 21-methyl-Δ⁴-pregnene-17α,21A-diol-3,11,20-trione 21-acetate

M.P.=179–180° C.
$[\alpha]_D = +169°$

III. 6α,9α - difluoro - 21-methyl-Δ$^{1,4}$-pregnadiene-11β,17α,21B-triol-3,20-dione 21-acetate M.P.=244.5–245° C.
$[\alpha]_D = +86°$ IV. 6α,9α - difluoro - 21-methyl-Δ$^{1,4}$-pregnadiene-11β,17α,21A-triol-3,20-dione 21-acetate M.P.=241–243° C. (d.)

V. 9α - fluoro - 21 - methyl-Δ$^{1,4}$-pregnadiene-11β,17α,21B-triol-3,20-dione 21-acetate M.P.=234–238° C. (d.)
$[\alpha]_D = +127°$ VI. 9α - fluoro - 21-methyl-Δ$^{1,4}$-pregnadiene-11β,17α,21A-triol-3,20-dione 21-acetate M.P.=247–248° C.
$[\alpha]_D = +60.2°$

What is claimed is:

1. A process for the inversion of the epimeric forms of 21-methyl steroids which comprises reacting the 21-monosulfonic acid ester of the epimer to be inverted, in a solvent selected from the group consisting of dimethylformamide and lower aliphatic oxygenated solvents containing up to five carbon atoms and mixtures of these, with from about a 200% molar excess to about a 2000% molar excess of an alkali metal salt of a carboxylic acid at a temperature of from about 20° C. to about 70° C. for a period of from about 1 to about 24 hours, to produce a 21-carboxylic acid ester having the opposite configuration.

2. A process as in claim 1 wherein the solvent is acetone.

3. A process as in claim 1 wherein the solvent comprises acetone containing from about 10% to about 50% by volume of dimethylformamide.

4. A process as in claim 1 wherein a 21-mesylate ester is used.

5. A process as in claim 1 wherein a 21-tosylate is used.

6. A process as in claim 1 wherein 9α-fluoro-21-methyl-Δ$^{1,4}$-pregnadiene-11β,17α,21A-triol-3,20-dione 21-mesylate is converted to 9α-fluoro-21-methyl-Δ$^{1,4}$-pregnadiene-11β,17α,21B-triol-3,20-dione 21-acetate.

7. A process as in claim 1 wherein 9α-fluoro-21-methyl-Δ$^{1,4}$-pregnadiene-11β,17α,21B-triol-3,20-dione 21-mesylate is converted to 9α-fluoro-21-methyl-Δ$^{1,4}$-pregnadiene-11β,17α,21A-triol-3,20-dione 21-acetate.

References Cited in the file of this patent

Beyler et al.: Journal of Organic Chemistry, vol. 24, page 1386 (September 1959).

Figdor et al.: Abstract 137th A.C.S. Meeting, Cleveland, Ohio, page 21 N (April 1960).